2,987,503
POLYESTERS LIGHT-STABILIZED WITH 4-THIAZOLIDONE DERIVATIVES

James A. Van Allan, Rochester, N.Y., and Gerald R. Lappin and John W. Tamblyn, Kingsport, Tenn., assignors to Eastman Kodak Company, Rochester, N.Y., a corporation of New Jersey
No Drawing. Filed Jan. 4, 1957, Ser. No. 632,406
9 Claims. (Cl. 260—75)

This invention concerns light-stabilized plastic compositions, more particularly polymeric materials in which the light-stabilizing radical is part of the polymer molecule.

It has been customary to stabilize plastic compositions against the deteriorating action of ultraviolet light by incorporating in these compositions a light-stabilizing additive. With relatively thick plastic pieces this practice has been very successful. However, with thin films and fibers, such additives have proved quite ineffective, because they are soon lost by evaporation or leaching or both during exposure. In these thin sections there is no internal reservoir of stabilizer to keep furnishing the exposed surface with a fresh supply by diffusion Plastic materials which are made and processed at high temperatures, such as the polyesters, pose a particularly difficult problem with regard to the successful incorporation of organic light stabilizers.

We have found that certain thiazolidone derivatives have the requisite thermal stability to survive the high temperatures at which certain polyesters are made and processed. In addition, we have discovered that when the thiazolidones are attached to the molecule and inserted in the polyester chain that thin films and fibers made from such stabilized polyesters have improved light and weathering stability.

One object of this invention is to provide light stabilizers for polymeric materials. Another object of this invention is to provide light stabilizers for thin films and fibers which will not leach out or evaporate. A further object of this invention is to provide a light stabilizer which may be chemically built into the chain molecule of polyesters. An additional object of this invention is to provide a light stabilizer which will withstand the high temperatures at which polyesters are made and processed. Another object is to provide a polyester material which has a light stabilizer polymerized in the polyester.

In the practice of our invention we prepare derivatives of thiazolidones with bi- or polyfunctional glycol or acid groupings attached to the molecule so that they may be inserted in the polyester chain at any desired concentration.

In our preferred embodiment of the invention, 5-benzal-3-p-β-hydroxyethylphenyl-2-p-β-hydroxyethylphenylimino-4-thiazolidone is prepared as follows:

A mixture of 200 grams of 2-p-aminophenyl ethanol, 200 ml. of carbon disulfide and 200 ml. of ethanol was refluxed 70 hours. The product separated at the end of this time in a solid crystalline mass. Excess solvent was removed on the steam bath and the residue was recrystallized from dioxane to give 101 g. of 4,4'-di-(β-hydroxyethyl) thiocarbanilide, M.P. 178° C. 56 g. of this product, 24 g. of chloroacetic acid, 24 g. of sodium acetate and 200 ml. of ethanol were mixed and refluxed overnight. The ethanol was evaporated and water added to the residue. The crystals were filtered off and recrystallized from methanol-water to give 56 g. of 3-(p-β-hydroxyethylphenyl)-2-(p-β-hydroxyethylphenylimino)-4-thiazolidone, M.P. 124° C. 8.9 g. of this thiazolidone, 4.0 ml. of benzaldehyde, 2 ml. of piperidine and 50 ml. of methanol were mixed and refluxed 5 hours. Water was added to the reaction mixture. An oil, which soon solidified, separated. Recrystallization from methanol-water gave 11 g. of the desired product, 5-benzal-3-p-β-hydroxyethylphenyl-2-p-β-hydroxyethylphenylimino-4-thiazolidone, M.P. 129–130° C.

The following examples illustrate the preparation of the stabilized polyesters, but are not intended to limit the scope of our invention:

EXAMPLE 1

A polyester from 25 mole percent p,p'-dicarboxydiphenylsulfone, 25 mole percent sebacic acid and 50 mole percent 1,5-pentanediol containing approximately 5 percent of the bifunctional thiazolidone described above was prepared as follows:

A mixture of 104.5 g. (0.25 mole) of dibutyl-p,p'-sulfonyldibenzoate, 78.5 g. (0.25 mole) of dibutyl sebacate, 104 g. (1.0 mole) of 1,5-pentanediol, 10 g. of the stabilizer described above and 1.0 ml. of a solution of 2 percent $NaHTi(OC_4H_9)_6$ was stirred and heated. The mixture was heated at atmospheric pressure until no further distillate came over (about 1 hour) and the pot temperature had reached 230° C. Heating was then continued at a pressure of about 0.2 mm. and a pot temperature of 250–260° C. for 12 minutes. The hot melt was poured into water. The dried prepolymer was washed with acetone and ground to pass a 20-mesh screen. It was then heated for 3.5 hours at 160–190° C. at a pressure of 0.07 mm. to give 114 g. of pale yellow polymer, inherent viscosity 0.86, at a concn. of 0.25 g./100 cc. in 60:40 (by weight) phenol:tetrachloroethane at 25.0° C. which contained approximately 5 percent of the described stabilizer.

EXAMPLE 2

A polyester was prepared from 41.5 mole percent p,p'-dicarboxydiphenyl sulfone, 8.5 mole percent succinic acid and 50 mole percent 1,5-pentanediol containing approximately three percent of the bifunctional thiazolidone described above as follows:

The polymer was prepared by a method analogous to that of Example 1 from 209 g. (0.5 mole) of dibutyl-p,p'-sulfonyldibenzoate, 10 g. (0.1 mole) of succinic anhydride, 125 g. (1.2 mole) of 1,5-pentanediol, 2.1 g. of the stabilizer described above, and 0.7 ml. of 2 percent $NaHTi(OC_4H_9)_6$ solution. There were obtained 132 g. of pale yellow polymer, inherent viscosity 1.00, measured as in Example 1, which contained about 3 percent of the the built-in stabilizer.

The structural formula for the condensation polymer from dibutyl-p,p'-sulfonyldibenzoate and 5-benzal-3-(p-β-hydroxyethylphenyl)-2-(p-β-hydroxyethylphenylimino)-4-thiazolidone is indicated below:

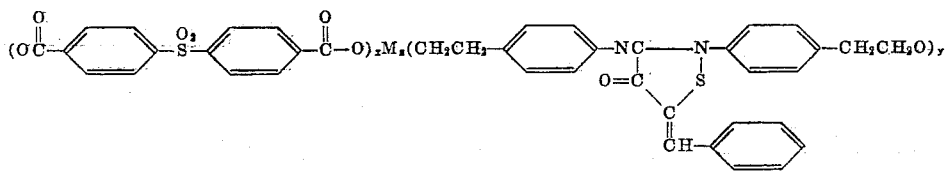

where $x = z + y$ and the ratio of $z$ to $y$ may be varied widely. M is a glycol residue.

EXAMPLE 3

A polyester was prepared from 37.5 mole percent terephthalic acid, 12.5 mole percent succinic acid and 50 mole percent 1,4-cyclohexanedimethanol containing approximately one percent of the bifunctional thiazolidone described above as follows:

A polyester was prepared by a method analogous to Example 1 from 116 g. (0.6 mole) of dimethylterephthalate, 20 g. (0.2 mole) of succinic anhydride, 144 g. (1.0 mole) of 1,4-cyclohexanedimethanol, 2.1 g. of the stabilizer described above, and 0.9 ml. 2 percent $NaHTi(OC_4H_9)_6$ solution. There were obtained 165 g. of pale yellow polymer, inherent viscosity 0.75, measured as in Example 1, which contained approximately 1 percent of the subject additive.

EXAMPLE 4

The polyester described above in Example 1 was melt-spun into 3-denier yarn filaments and exposed in a modified Atlas Twin-Arc Weather-Ometer (Anal. Chem., 25, 460 (1953)). Similar yarn, made from a polyester of the same composition without the built-in thiazolidone was also exposed for comparison. Table I shows the improvement in light stability, as measured by retention of tenacity and elongation during exposure, of the stabilized yarn over the unstabilized yarn. The rate of loss of these physical properties may be seen to be some 25 times slower in the stabilized yarn.

Table I

| Yarn | Exposure Time (Hr.) | Percent of Original Property Retained | |
|---|---|---|---|
| | | Tenacity | Elongation |
| Unstabilized | 0 | 100 | 100 |
| | 7 | 26 | 37 |
| | 15 | 29 | 36 |
| | 22 | 26 | 29 |
| | 37 | 15 | 17 |
| Stabilized | 0 | 100 | 100 |
| | 24 | 114 | 78 |
| | 47 | 64 | 67 |
| | 95 | 75 | 56 |
| | 189 | 48 | 29 |
| | 237 | 42 | 30 |
| | 355 | 43 | 33 |

EXAMPLE 5

The polyester described above in Example 2 was melt-spun into 3-denier fialments and exposed as in Example 4 along with similar yarn made from an unstabilized polyester of the same composition. In addition, a third yarn sample, containing three parts of a similar thiazolidone (5-benzal-3-(o-ethylphenyl)-2-(o-ethylphenylimino-4-thiazolidone)) simply mixed into but not chemically built into 100 parts of the polyester, was also made and tested. The results, given in Table II show that the yarn containing the chemically built-in stabilizer had about 10 times the weathering resistance of the unstabilized yarn, while the yarn containing the mixed-in stabilizer had only about 4 times the weathering resistance of the unstabilized yarn.

Table II

| Yarn | Exposure Time (Hr.) | Percent of Original Property Retained | |
|---|---|---|---|
| | | Tenacity | Elongation |
| Unstabilized | 0 | 100 | 100 |
| | 6 | 66 | 70 |
| | 16 | 30 | 25 |
| | 24 | 25 | 21 |
| | 40 | 15 | 12 |
| Stabilized with 3 parts thiazolidone (mixed in) | 0 | 100 | 100 |
| | 8 | 88 | 85 |
| | 14 | 75 | 76 |
| | 24 | 55 | 50 |
| | 40 | 38 | 39 |
| | 65 | 20 | 18 |
| Stabilized with 3 parts thiazolidone (chemically built in) | 0 | 100 | 100 |
| | 8 | 96 | 100 |
| | 19 | 94 | 103 |
| | 42 | 61 | 67 |
| | 86 | 46 | 61 |
| | 133 | 49 | 53 |
| | 177 | 49 | 42 |

EXAMPLE 6

The polyester described above in Example 3 was melt-spun into 3-denier filaments and exposed as in Example 4 along with similar yarn made from an unstabilized polyester of the same composition. Yarn made from the polyester of terephthalic acid and ethylene glycol was also made in the unstabilized form and tested for comparison. Table III gives the results. The polyester containing the chemically built-in stabilizer showed about three times as good a weathering resistance as either of the unstabilized polyesters. The inherent stability of the unstabilized polyesters used in this example was much greater than the stability of the unstabilized polyesters used in Examples 4 and 5.

Table III

| Yarn | Exposure Time (Hr.) | Percent Original Elongation Retained |
|---|---|---|
| Unstabilized polyester of terephthalic acid and ethylene glycol | 0 | 100 |
| | 18 | 79 |
| | 43 | 53 |
| | 86 | 44 |
| | 157 | 36 |
| | 275 | 33 |
| | 520 | 12 |
| Unstabilized polyester of terephthalic acid, succinic acid and 1,4-cyclohexane dimethanol | 0 | 100 |
| | 18 | 65 |
| | 43 | 63 |
| | 86 | 57 |
| | 157 | 35 |
| | 275 | 13 |
| | 520 | 5 |
| Stabilized polyester of terephthalic acid, succinic acid and 1,4-cyclohexane dimethanol | 0 | 100 |
| | 47 | 96 |
| | 94 | 73 |
| | 141 | 60 |
| | 188 | 60 |
| | 235 | 49 |
| | 423 | 36 |

EXAMPLE 7

The stabilized polyester described in Example 1 was dissolved in tetrachloroethane and cast into a film 3 mils thick. Similar films were made from (a) the corresponding unstabilized polyester and (b) the mixture of the unstabilized polyester with 5% of the stabilizer 5-benzal-3-p-β-hydroxyethylphenyl-2-p-β-hydroxyethylphenylimino-4-thiazolidone. In the first film the stabilizer was chemically combined with the polyester. In the third film the stabilizer was simply mechanically mixed in.

These films were exposed as in Example 4 and examined from time to time for signs of developing brittleness. As shown by the data in Table IV the chemically combined stabilizer was much superior to the mechanically added stabilizer.

Table IV

| Film | Exposure Time (hr.) Required to Cause | |
|---|---|---|
| | Cracks on Creasing | Break on Creasing |
| Unstabilized polyester | 8 | 20 |
| Stabilized polyester (stabilizer mechanically mixed in) | 200 | 300 |
| Stabilized polyester (stabilizer chemically built in) | 700 | 1,300 |

These chemically built-in stabilizers may be applied to a great variety of polymeric materials besides polyesters. Cellulose esters, for example, containing stabilizing groupings in place of some of the esters groupings, can be made. Vinyl polymers made in the presence of copolymerizable groupings can also be synthesized.

Other bi- and polyfunctional derivatives, such as carboxy, carboalkoxy or amino derivatives, are within the scope of our invention and may be employed alternatively to the di-(β-hydroxyethyl) derivative illustrated in the above examples. Isomeric forms, such as 5-p-β-hydroxy-ethylbenzal-3-p-β-hydroxyethylphenyl-2-phenylimino - 4 - thiazolidone can also be used.

The following structural formula indicates the general configuration operable in our invention.

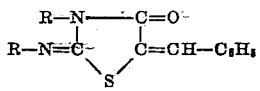

R may be 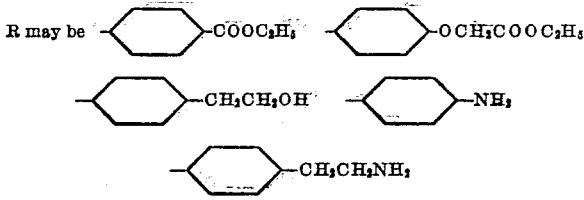

Our preferred embodiment, 5-benzal-3-(p-β-hydroxy-ethylphenyl)-2-(p-β-hydroxyethylphenylimino)-4-thiazolidone is represented as follows:

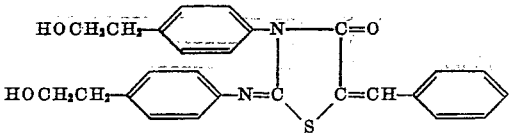

However, the isomer, 5-p-β-hydroxyethylbenzal-3-p-β-hydroxyethylphenyl-2-phenylimino-4-thiazolidone can also be used. It is represented structurally as follows:

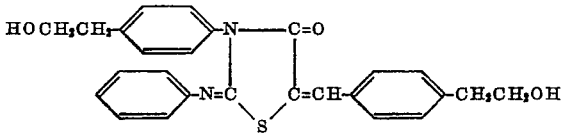

Among the typical polyesters in which these thiazolidones may be incorporated by polymerizing with the monomers are those disclosed in the copending U.S. patent application Serial No. 554,639, filed December 22, 1955.

The preferred embodiment of our invention is the use of 1–6% of the built in stabilizer based on the weight of the polymeric material.

We claim:

1. A process for stabilizing a polyester from a dihydric alcohol and a dicarboxylic acid comprising adding 1–6% based on the weight in combined form of the final polymeric material of a 4-thiazolidone having the formula:

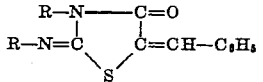

in which R is selected from the class consisting of

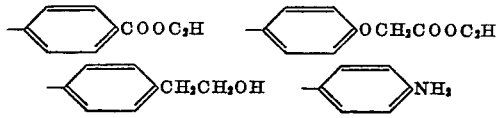

and

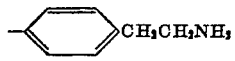

to the polymerizable mixture prior to polymerization, polymerizing the mixture under polyesterification conditions and recovering the stabilized polymer from the mixture.

2. A process for stabilizing a polyester from a dihydric alcohol and a dicarboxylic acid comprising adding to the polymerizable mixture prior to polymerization 1–6% by weight in combined form of the final polymeric material of 5-benzal-3-p-β-hydroxyethylphenyl-2-p-β-hydroxyethylphenylimino-4-thiazolidone, polymerizing the polymerizable mixture under polyesterification conditions, and removing the polymer from the mixture.

3. A process for stabilizing a polyester of terephthalic acid, a dicarboxylic acid having 4–12 carbon atoms, and ethylene glycol comprising adding 1–6% by weight in combined form of the amount of final polymer of 4-thiazolidone having the formula:

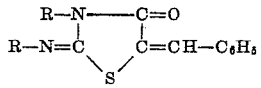

in which R is selected from the class consisting of

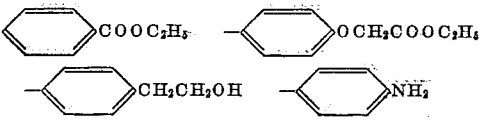

and

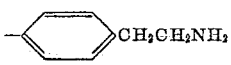

to the polymerizable mixture of terephthalic acid, a dicarboxylic acid having 4–12 carbon atoms and ethylene glycol prior to polymerization, polymerizing the polymerizable mixture under polyesterification conditions, and removing the polymer from the mixture.

4. A process for stabilizing a polyester of p,p'-dicarboxydiphenyl sulfone, pentanediol, and a dicarboxylic acid having 4–12 carbon atoms, comprising adding 1–6% by weight in combined form of the polymer of a 4-thiazolidone having the formula:

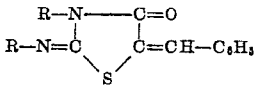

in which R is selected from the class consisting of

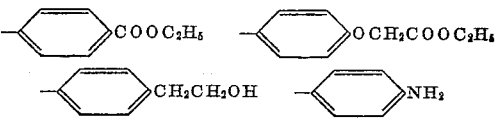

and

to the polymerizable mixture of p,p'-dicarboxydiphenyl sulfone, pentanediol, and a dicarboxylic acid having 4–12 carbon atoms, polymerizing the polymerizable mixture under polyesterification conditions, and removing the polymer from the mixture.

5. A polyester from a dihydric alcohol and a dicarboxylic acid containing 1–6% by weight in combined form of the total polymeric mixture of a 4-thiazolidone having the formula:

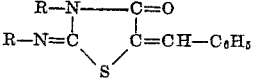

in which R is selected from the class consisting of

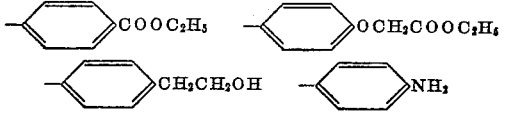

and

6. A polyester of terephthalic acid, a dicarboxylic acid having 4–12 carbon atoms, ethylene glycol and 1–6% by weight of the polyester in combined form of 5-benzal-3-p-β-hydroxyethylphenyl-2-p-β-hydroxyethylphenylimino - 4-thiazolidone.

7. A polyester of p,p'-dicarboxydiphenyl sulfone, a dicarboxylic acid having 4–12 carbon atoms, pentanediol, and 1–6% by weight of the polyester by weight in combined form of 5-benzal-3-p-β-hydroxyethylphenyl-2-p-β-hydroxyethylphenylimino-4-thiazolidone.

8. A polyester of terephthalic acid, a dicarboxylic acid having 4–12 carbon atoms, ethylene glycol, and 1–6% by weight of the polyester in combined form of a 4-thiazolidone having the formula:

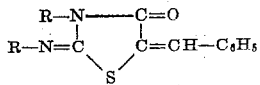

in which R is selected from the class consisting of

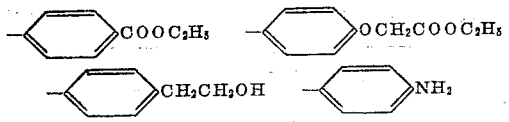

and

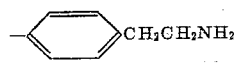

9. A polyester of p,p'-dicarboxydiphenyl sulfone, a dicarboxylic acid having 4–12 carbon atoms, pentanediol, and 1–6% by weight of the polyester in combined form of a 4-thiazolidone having the formula:

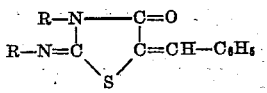

in which R is selected from the class consisting of

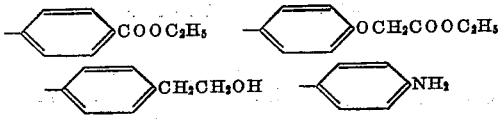

and

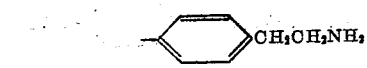

References Cited in the file of this patent
UNITED STATES PATENTS

| | | |
|---|---|---|
| 2,352,152 | Kaplan | June 20, 1944 |
| 2,399,118 | Homeyer | Apr. 23, 1946 |
| 2,680,727 | Jarboe | June 8, 1954 |
| 2,784,087 | Sawdey et al. | Mar. 5, 1957 |
| 2,875,053 | Minsk | Feb. 24, 1959 |